(12) United States Patent
Lee

(10) Patent No.: US 7,571,601 B2
(45) Date of Patent: Aug. 11, 2009

(54) METHOD AND APPARATUS FOR CONTROLLING REGENERATION OF SIMULTANEOUS NOX-PM REDUCTION DEVICE

(75) Inventor: Jin Ha Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 696 days.

(21) Appl. No.: 11/303,814

(22) Filed: Dec. 15, 2005

(65) Prior Publication Data

US 2007/0130919 A1 Jun. 14, 2007

(30) Foreign Application Priority Data

Dec. 9, 2005 (KR) .................. 10-2005-0120264

(51) Int. Cl.
*F01N 3/00* (2006.01)
(52) U.S. Cl. .............. 60/286; 60/274; 60/276; 60/285; 60/295; 60/297
(58) Field of Classification Search ............ 60/274, 60/276, 285, 286, 297, 303
See application file for complete search history.

(56) References Cited

U.S. PATENT DOCUMENTS

| | | | |
|---|---|---|---|
| 6,851,258 B2 * | 2/2005 | Kawashima et al. | 60/311 |
| 6,854,265 B2 * | 2/2005 | Saito et al. | 60/295 |
| 6,948,311 B2 * | 9/2005 | Schaller et al. | 60/286 |
| 6,983,591 B2 * | 1/2006 | Kondo et al. | 60/295 |
| 7,082,754 B2 * | 8/2006 | Otake et al. | 60/295 |
| 2007/0180818 A1 * | 8/2007 | Matsuoka et al. | 60/286 |
| 2008/0190098 A1 * | 8/2008 | Colignon | 60/295 |

FOREIGN PATENT DOCUMENTS

| | | |
|---|---|---|
| CN | 1619121 | 5/2005 |
| DE | 198 08 382 A1 | 9/1999 |
| DE | 100 40 554 A1 | 2/2002 |
| DE | 10 2004 005 321 A1 | 8/2005 |
| EP | 1 281 852 A2 | 2/2003 |
| JP | 2003-003829 | 1/2003 |
| JP | 2003-035131 | 2/2003 |
| JP | 2004-162633 | 6/2004 |
| JP | 2004-183525 | 7/2004 |

* cited by examiner

*Primary Examiner*—Tu M Nguyen
(74) *Attorney, Agent, or Firm*—Peter F. Corless; Edwards Angell Palmer & Dodge LLP

(57) ABSTRACT

The present invention provides a method for controlling regeneration of the simultaneous NOx-PM reduction apparatus having a lean NOx trap (LNT) for removing nitrogen oxide (NOx) an engine and a catalytic particulate filter (CPF) for trapping a particulate matter (PM) of the engine. According to an exemplary method, depending on the trapped PM amount in the CPF, the simultaneous NOx-PM reduction apparatus is regenerated according to a dual step regeneration including a mild regeneration at a low CPF interior temperature and a strong regeneration at a high CPF interior temperature.

27 Claims, 5 Drawing Sheets

METHOD AND APPARATUS FOR CONTROLLING REGENERATION OF SIMULTANEOUS NOX-PM REDUCTION DEVICE

CROSS-REFERENCE TO RELATED APPLICATION

This application claims priority to and the benefit of Korean Patent Application No. 10-2005-0120264 filed in the Korean Intellectual Property Office on Dec. 9, 2005, the entire contents of which are incorporated herein by reference.

BACKGROUND OF THE INVENTION (a) Field of the Invention

The present invention relates to purification of an exhaust gas of a diesel engine vehicle. More particularly, the present invention relates to a method and apparatus for controlling regeneration of a simultaneous NOx-PM reduction apparatus having a lean NOx trap (LNT) and a catalytic particulate filter (CPF).

(b) Description of the Related Art

Nitrogen oxides (NOx) and particulate matters (PM) are principal air pollution material of a diesel engine vehicle. Therefore, they are under strict emission regulation of a diesel engine.

Several technologies have been developed to cope with the emission regulation of the diesel engine. For example, fuel injection timing may be delayed. In addition, exhaust gas recirculation (EGR) has been enhanced such that NOx exhaust may be reduced. In addition, combustion characteristic of the diesel engine has been improved so as to reduce PM.

Such technologies for complying with the diesel engine emission regulation may be classified as an engine improving technology and a post-processing technology. Examples of the post-processing technology for reducing the principal exhaust gas of a diesel engine are (1) oxidation catalyst for purifying high boiling point hydrocarbon (HC) among the particulate matters, (2) a DeNOx catalyst for decomposition or reduction of the NOx under an excess oxygen atmosphere, and (3) a diesel particulate filter (DPF) system filtering the PM.

Among such a post-processing technology, a simultaneous NOx-PM reduction apparatus having a lean NOx trap (LNT) and a catalytic particulate filter (CPF) is also included. Regarding the simultaneous NOx-PM reduction apparatus, it is believed that simultaneous generation of the LNT and DPF is not possible. In addition, the regeneration of LNT is required to be performed in a rich range of an air/fuel ratio, and thus the regeneration of the LNT causes a substantial amount of PM.

The DPF system has merit in that PM is sufficiently trapped so as to substantially decrease an exhaust of the PM. However, apparatus and/or algorithm for a regeneration control of the trapped PM by an after-burning thereof have not been sufficiently investigated. Consequently, in current systems, durability of the DPF is still problematic since an excessive heat may be produced during the regeneration of the filter thereby causing damage of the DPF. In addition, during a large scale of EGR for removal of the NOx, a substantial amount of the PM is produced. Therefore, in this case, a PM trapping limit of a catalyst support of the DPF easily becomes saturated, and this may be a cause of the damage of the support of the DPF during an active regeneration of the DPF.

In particular, according to the conventional regeneration method, an interior temperature of the DPF is maintained at about 550° C. by raising the exhaust gas temperature by fuel post-injection of the engine, and the trapped PM in the DPF is burned by the heat of the exhaust gas. In addition, the regeneration of the DPF is performed under a regeneration condition that is not dependent on trapped PM amount. However, when the interior temperature of DPF is failed to be strictly controlled under 1,000° C., a SiC support may be damaged by an abrupt increase of the interior temperature of DPF abruptly increase. Therefore, conventionally, even if the filter of SiC material has a PM trapping capacity of 10 g/l, the DPF regeneration is performed under a condition of less than 6 g/l for safety and durability. In addition, the interior temperature of DPF is controlled to be lower than 700° C.

However, from such a mild regeneration, only a relatively low DPF regeneration efficiency may be achieved. In addition, in this case, a central area of the DPF is intensively regenerated, and accordingly PM usually remains at a marginal area thereof. Therefore, after a repeated regeneration, the PM remaining at the marginal area of the DPF suddenly exceeds the SiC regeneration limit and in this case, support damage may be caused by an uncontrolled combustion. In addition, an enhancement of the DPF regeneration efficiency and prevention of a deterioration of fuel consumption may be achieved by increasing the interior temperature of the DPF. When the post-injecting fuel amount is increases or injection timing is adjusted in order to the increase of the interior temperature of the DPF, the LNT disposed in front of the DPF tends to be easily degraded.

Due to such a defective possibility, even if the CPF may have the PM trapping capacity of 10 g/l, the regeneration is performed when the trapped PM amount reaches about 4-5 g/l, which is equal to or less than a half of the trapping capacity. Therefore, the regeneration is frequently performed, and the fuel consumption is substantially deteriorated.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

In one aspect, methods and apparatus and preferred for controlling regeneration of a simultaneous NOx-PM reduction apparatus having a lean NOx trap (LNT) and a catalytic particulate filter (CPF) that achieves an improvement of the regeneration efficiency and prevention of a CPF support damage and LNT degradation by applying different regeneration control of the CPF depending on the trapped PM amount.

An exemplary preferred apparatus according to an embodiment of the present invention is an apparatus for controlling regeneration of the simultaneous NOx-PM reduction apparatus having a lean NOx trap (LNT) for removing nitrogen oxide (NOx) of an engine and a catalytic particulate filter (CPF) for trapping a particulate matter (PM) of the engine.

The exemplary apparatus for controlling regeneration of the simultaneous NOx-PM reduction apparatus suitably may include: a first exhaust gas temperature sensor detecting a temperature of an exhaust gas of the engine; a second exhaust gas temperature sensor detecting a temperature of an exhaust gas flowing between the LNT and the CPF in simultaneous NOx-PM reduction apparatus; a CPF temperature sensor detecting an interior temperature of the CPF; a differential pressure sensor detecting a pressure difference across the simultaneous NOx-PM reduction apparatus; an oxygen sensor detecting an oxygen density of the exhaust gas of the engine; a NOx sensor detecting a NOx density in the exhaust gas; and a control unit receiving signal from the sensors and performing a regeneration control of the simultaneous NOx-PM reduction apparatus based on the received signal, wherein the control unit executes instructions for performing an exemplary method for controlling regeneration of the simultaneous NOx-PM reduction apparatus.

An exemplary preferred method according to an embodiment of the present invention is a method for controlling regeneration of the simultaneous NOx-PM reduction apparatus having a lean NOx trap (LNT) for removing nitrogen oxide (NOx) of an engine and a catalytic particulate filter (CPF) for trapping a particulate matter (PM) of the engine.

The exemplary method for controlling regeneration of the simultaneous NOx-PM reduction apparatus suitably may include: detecting an exhaust gas differential pressure ΔP across the simultaneous NOx-PM reduction apparatus; determining whether the differential pressure is above a first predetermined differential pressure; determining whether the exhaust gas temperature of the engine lies in a predetermined temperature range, when the differential pressure ΔP is above the first predetermined differential pressure; performing a third post-injection by a predetermined third injection amount and a predetermined third retardation angle of fuel injection, when the exhaust gas temperature of the engine does not lie in the predetermined temperature range; determining whether a predetermined mild regeneration finishing condition is satisfied, when the exhaust gas temperature of the engine lies in the predetermined temperature range; determining whether a predetermined strong regeneration starting condition is satisfied, when the mild regeneration finishing condition is satisfied; performing a normal main fuel injection, the third post-injection, and a fourth post-injection by a fourth injection amount and a fourth retardation angle of fuel injection, when the predetermined strong regeneration starting condition is satisfied; determining whether a predetermined strong regeneration finishing condition is satisfied; and preferably finishing the third post-injection and the fourth post-injection when the strong regeneration finishing condition is satisfied.

The predetermined temperature range may include a range of e.g. 600° C. to 700° C.

The fourth injection amount and the fourth retardation angle of fuel injection may be set to be levels such that the CPF interior temperature may exceed 800° C.

The first predetermined differential pressure may be above a differential pressure corresponding to a half of a trapping capacity of the CPF.

The first predetermined differential pressure may be a differential pressure corresponding to a trapped PM amount of about 4 g/l or 5 g/l or more such as about 6 g/l.

The predetermined mild regeneration finishing condition may include a condition that the differential pressure is below a second predetermined differential pressure.

The second predetermined differential pressure may be a differential pressure corresponding to a trapped PM amount of about 3 g/l or more such as about 4 g/l.

The predetermined strong regeneration starting condition may include a condition that a CPF interior temperature is stable at above an exhaust gas temperature of the engine by not more than a predetermined temperature difference.

The predetermined temperature difference may be about greater than 10° C. or 15° C. such as about 20° C.

The predetermined strong regeneration finishing condition may include a condition that the differential pressure is below the third predetermined differential pressure.

The third predetermined differential pressure may be a differential pressure corresponding to a trapped PM amount of about 0.5 g/l or more such as about 1 g/l.

The fourth injection amount may be larger than the third injection amount, and the fourth retardation angle of fuel injection may be greater than the third retardation angle of fuel injection.

In addition, the exemplary method may further include: detecting an exhausted NOx amount contained in the exhaust gas of the engine; and performing a regeneration control of the LNT when the exhausted NOx amount is above a predetermined level.

The performing of regeneration control of the LNT may include: performing a first post-injection of the engine by a predetermined first injection amount and a predetermined first retardation angle of fuel injection; determining whether a predetermined LNT regeneration condition is satisfied; and continuing the LNT regeneration until a predetermined LNT regeneration finishing condition, when the predetermined LNT regeneration condition is satisfied.

The predetermined LNT regeneration condition may include: the exhaust gas temperature of the engine is above a predetermined temperature; and the air/fuel ratio determined based on the signal received from the $O_2$ sensor is in a rich range.

The predetermined temperature may be in excess of about 200° C. such as about 250° C.

The LNT regeneration finishing condition may include a condition that a predetermined time has elapsed after the satisfaction of the LNT regeneration condition.

The performing of regeneration control of the LNT may further include performing a predetermined exhaust gas temperature increasing process, when the predetermined LNT regeneration condition is not satisfied.

The predetermined exhaust gas temperature increasing process may include: retarding a main injection timing of the engine; and performing a second post-injection of the engine by a predetermined second injection amount and a predetermined second retardation angle of fuel injection.

The second injection amount may be larger than the first injection amount; and the second retardation angle of fuel injection may be greater than the first retardation angle of fuel injection.

The exhausted NOx amount may be detected as an amount of NOx contained in the exhaust gas that has passed the simultaneous NOx-PM reduction apparatus.

The invention also includes vehicles that comprise an apparatus as described herein or utilize a method as described herein.

It is understood that the term "vehicle" or "vehicular" or other similar terms as used herein is inclusive of motor vehicles in general such as passenger automobiles including sports utility vehicles (SUV), buses, trucks, various commercial vehicles, watercraft, aircraft, and the like. The present transmitting systems will be particularly useful with vehicles that comprise one or more diesel engines, such as a motor vehicle e.g. a passenger automobile, bus, truck or the like that comprises a diesel engine.

Other aspects of the invention are discussed below.

DETAILED DESCRIPTION

As discussed herein, in one preferred aspect a method for controlling regeneration of the simultaneous NOx-PM reduction apparatus is provided the method comprising: detecting an exhaust gas differential pressure $\Delta P$ across the simultaneous NOx-PM reduction apparatus; determining whether the differential pressure is above a first predetermined differential pressure; determining whether the exhaust gas temperature of the engine lies in a predetermined temperature range, when the differential pressure $\Delta P$ is above the first predetermined differential pressure; performing a third post-injection by a predetermined third injection amount and a predetermined third retardation angle of fuel injection, when the exhaust gas temperature of the engine does not lie in the predetermined temperature range; determining whether a predetermined mild regeneration finishing condition is satisfied, when the exhaust gas temperature of the engine lies in the predetermined temperature range; determining whether a predetermined strong regeneration starting condition is satisfied, when the mild regeneration finishing condition is satisfied; performing a normal main fuel injection, the third post-injection, and a fourth post-injection by a fourth injection amount and a fourth retardation angle of fuel injection, when the predetermined strong regeneration starting condition is satisfied; determining whether a predetermined strong regeneration finishing condition is satisfied. Preferably, the method may further comprise finishing the third post-injection and the fourth post-injection when the strong regeneration finishing condition is satisfied.

An exemplary embodiment of the present invention will hereinafter be described in detail with reference to the accompanying drawings.

Figure 1:
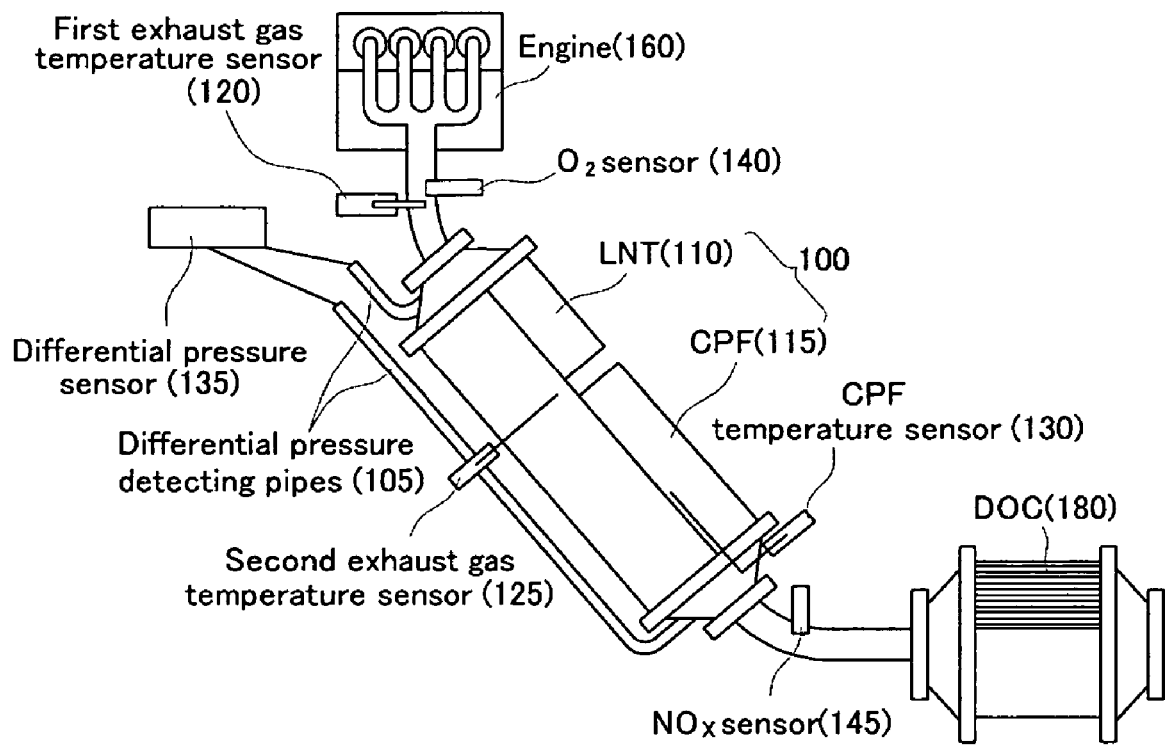
FIG. 1 is a schematic diagram of an apparatus for controlling regeneration of a simultaneous NOx-PM reduction apparatus according to an exemplary embodiment of the present invention.
Figure 2:
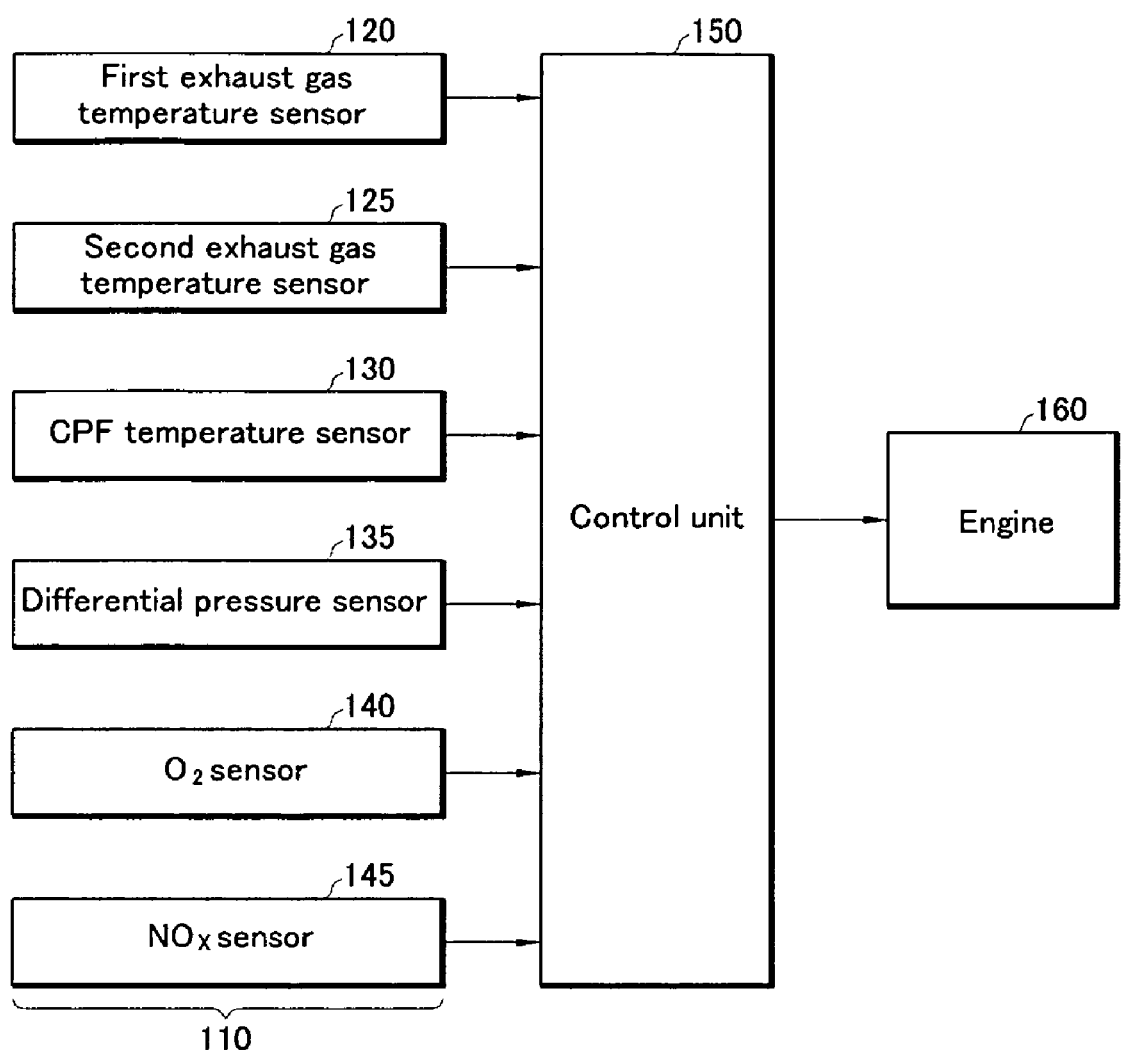
FIG. 2 is a block diagram showing electrical scheme of an apparatus for controlling regeneration of a simultaneous NOx-PM reduction apparatus according to an exemplary embodiment of the present invention.

FIG. 1 is a schematic diagram of an apparatus for controlling regeneration of a simultaneous NOx-PM reduction apparatus according to an exemplary embodiment of the present invention. In addition, FIG. 2 is a block diagram showing electrical scheme of an apparatus for controlling regeneration of a simultaneous NOx-PM reduction apparatus according to an exemplary embodiment of the present invention.

As shown in FIG. 1, in a simultaneous NOx-PM reduction system according to an exemplary embodiment of the present invention, a simultaneous NOx-PM reduction apparatus 100 is installed to an exhaust side of an engine 160. In addition, a diesel oxidation catalyst (DOC) 180 is disposed at a downstream side of the simultaneous NOx-PM reduction apparatus 100.

Within the simultaneous NOx-PM reduction apparatus 100, a lean NOx trap (LNT) 110 is disposed at an upstream side, and a catalytic particulate filter (CPF) 115 is disposed at a downstream side.

In an exemplary embodiment of the present invention, the LNT 110 is realized as, for example, an adsorber-catalyst removing the NOx by adsorbing. Such an adsorber-catalyst adsorbs the NOx in the lean combustion range and enables reduction of the adsorbed NOx in the rich combustion range above the theoretical air/fuel ratio.

As shown in FIG. 1, a regeneration control system for a simultaneous NOx-PM reduction apparatus 100 according to an exemplary embodiment of the present invention includes a sensor system 110 for detecting operating status of the engine 160 and the simultaneous NOx-PM reduction apparatus 100, and a control unit 150 for controlling the regeneration of the simultaneous NOx-PM reduction apparatus 100 on the basis of data detected from the sensor system 110.

The sensor system 110 includes a first exhaust gas temperature sensor 120 detecting a temperature of an exhaust gas of the engine 160, and a second exhaust gas temperature sensor 125 detecting a temperature of an exhaust gas flowing between the LNT 110 and the CPF 115 in simultaneous NOx-PM reduction apparatus 100, and a CPF temperature sensor 130 detecting an interior temperature of the CPF 115.

In addition, the sensor system 110 further includes a differential pressure sensor 135, an oxygen sensor ($O_2$ sensor) 140, and a NOx sensor 145. The differential pressure sensor 135 measures a pressure difference (that is, a pressure drop) between an inlet side (i.e., an inlet side of the LNT 110 and an outlet side (i.e., an outlet side of the CPF 115 of the simultaneous NOx-PM reduction apparatus 100. The $O_2$ sensor 140 detects an oxygen density of the exhaust gas of the engine 160. The NOx sensor 145 detects a NOx density in the exhaust gas.

The differential pressure sensor 135 is suitably connected with an inlet side and an outlet side of the simultaneous NOx-PM reduction apparatus 100 through differential pressure detecting pipes 105, and suitably detects a pressure difference (i.e., differential pressure) $\Delta P$ of pressures supplied therethrough.

Figure 3:
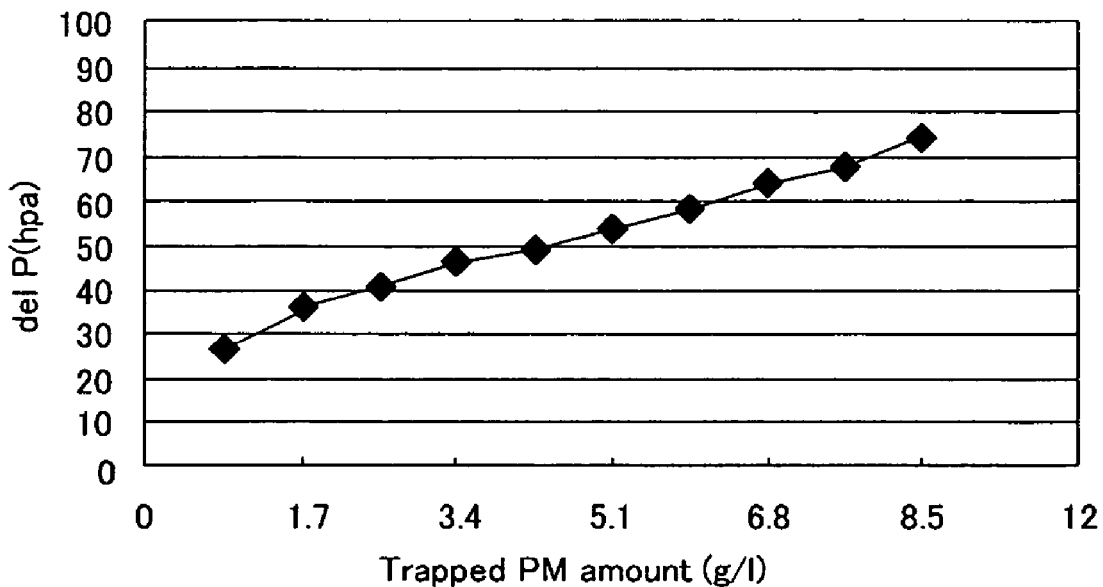
FIG. 3 is a graph showing an exemplary relationship between the differential pressure and the trapped PM amount of the CPF in a simultaneous NOx-PM reduction apparatus.

The differential pressure $\Delta P$ detected by the differential pressure sensor 135 has a correlation with the trapped PM amount of the CPF 115. An exemplary correlation between the differential pressure $\Delta P$ and the trapped PM amount of the CPF 115 is shown in FIG. 3. Generally, when the trapped PM amount becomes larger, the pressure difference between the inlet and outlet sides of the simultaneous NOx-PM reduction apparatus 100 becomes larger, since the exhaust gas cannot easily pass therethrough. Therefore, the trapped PM amount of the CPF 115 may be estimated on the basis of the differential pressure $\Delta P$ detected by the differential pressure sensor 135. Therefore, in the following description, the term "differential pressure", such as a "differential pressure of 1 g/l", is used to imply the corresponding amount of the trapped PM.

The NOx sensor 145 is installed at a downstream side of the CPF 115, and it detects NOx density contained in the exhaust gas that has passed through the simultaneous NOx-PM reduction apparatus 100.

The CPF temperature sensor 130 is connected to an interior of the CPF 115 so as to detect the interior temperature of the CPF 115.

The oxygen sensor 140 is installed between the engine 160 and the simultaneous NOx-PM reduction apparatus 100, and detects the $O_2$ density of the exhaust gas exhausted from the engine 160.

The first exhaust gas temperature sensor 120 is installed between the engine 160 and the simultaneous NOx-PM reduction apparatus 100, and detects the temperature of an exhaust gas of the engine 160.

The second exhaust gas temperature sensor 125 is connected to between the LNT 110 and the CPF 115 in the simultaneous NOx-PM reduction apparatus 100, and detects the temperature of the exhaust gas flowing therethrough.

The control unit 150 receives data from such a sensor system 110, and performs a regeneration control of the simultaneous NOx-PM reduction apparatus 100 based on the received data.

The control unit 150 may be realized as one or more microprocessors executing a predetermined program which includes a series of instructions for performing each step of the following method for controlling regeneration of the simultaneous NOx-PM reduction apparatus 100 according to an exemplary embodiment of the present invention.

Hereinafter, a method for controlling regeneration of the simultaneous NOx-PM reduction apparatus according to an exemplary embodiment of the present invention 100 will be described in detail with reference to FIG. 4 to FIG. 6.

Figure 4:
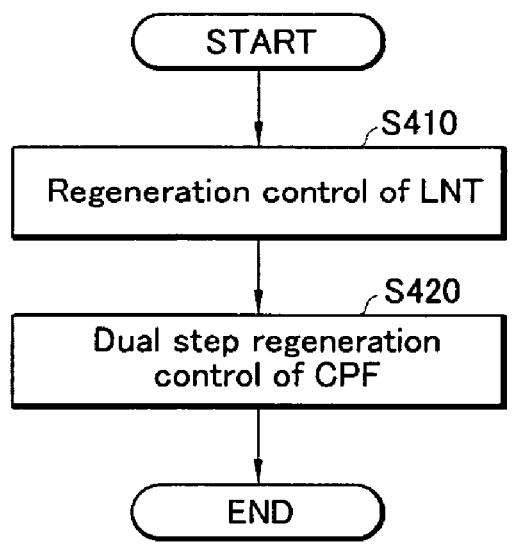
FIG. 4 is a flowchart showing a method for controlling regeneration of the simultaneous NOx-PM reduction apparatus according to an exemplary embodiment of the present invention.

FIG. 4 is a flowchart showing a method for controlling regeneration of the simultaneous NOx-PM reduction apparatus according to an exemplary embodiment of the present invention.

As shown in FIG. 4, a method for controlling regeneration of the simultaneous NOx-PM reduction apparatus according to an exemplary embodiment of the present invention includes a regeneration control process S410 of the LNT and a dual step regeneration control process S420 of the CPF.

Hereinafter, the regeneration control process S410 of the LNT 110 and the dual step regeneration control process S420 of the CPF 115 will be described in detail with reference to FIG. 5 and FIG. 6. Firstly, the regeneration control process S410 of the LNT 110 according to an exemplary embodiment of the present invention will be described in detail with reference to FIG. 5.

Figure 5:
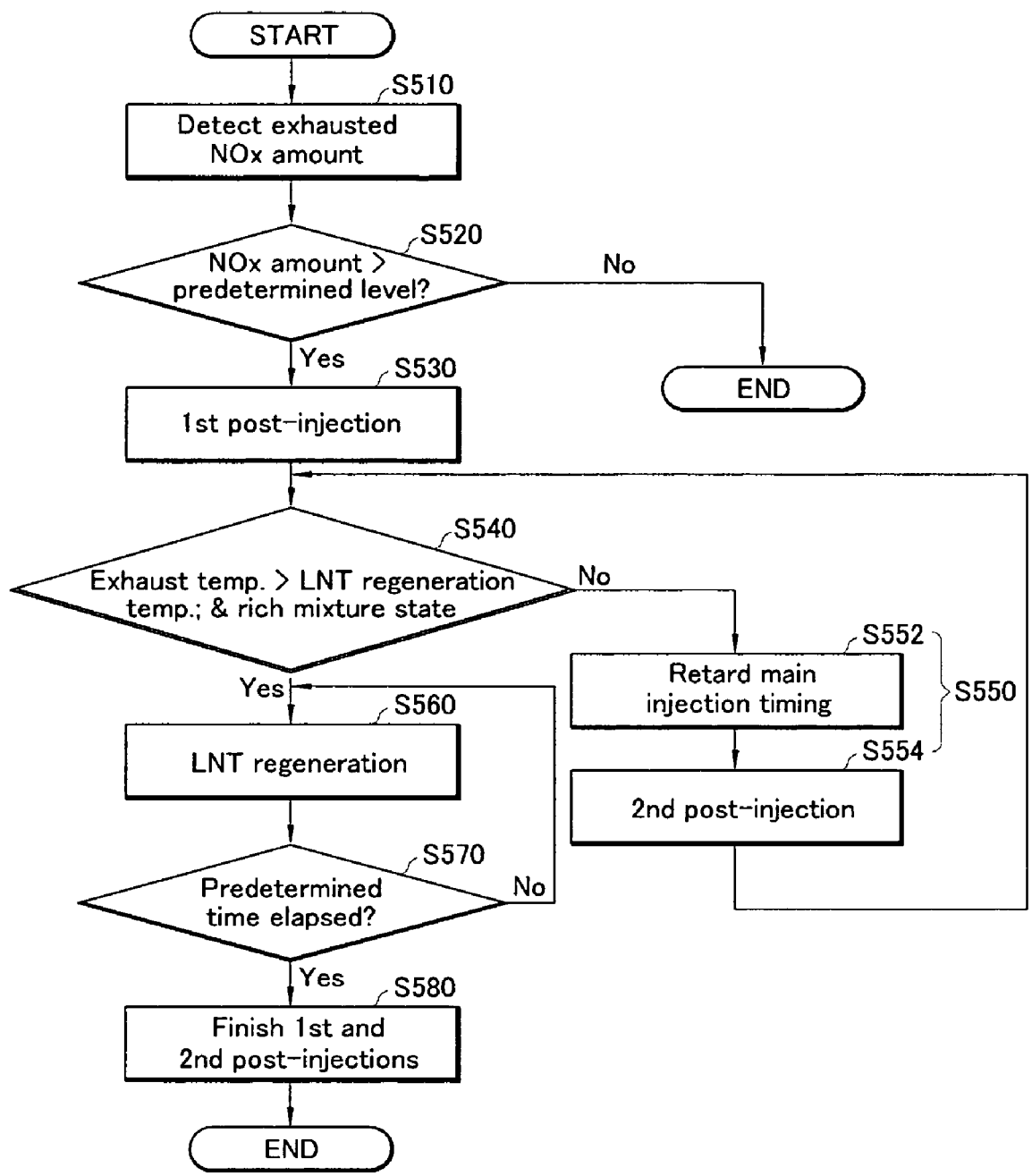
FIG. 5 is a detailed flowchart showing a regeneration control process of the LNT according to a method for controlling regeneration of the simultaneous NOx-PM reduction apparatus according to an exemplary embodiment of the present invention.

FIG. 5 is a detailed flowchart showing a regeneration control process S410 of the LNT according to a method for controlling regeneration of the simultaneous NOx-PM reduction apparatus according to an exemplary embodiment of the present invention.

As shown in FIG. 5, firstly at step S510, the control unit 150 detects an exhausted NOx amount of the exhaust gas on the basis of the signal received from the NOx sensor 145.

According to an exemplary embodiment of the present invention, the NOx sensor 145 is mounted at a rear of the simultaneous NOx-PM reduction apparatus 100. Therefore, according to an exemplary embodiment of the present invention, the NOx amount at the step S510 is measured for the exhaust gas that has passed through the simultaneous NOx-PM reduction apparatus 100. As should be understood, other configurations will be suitable. For instance, the NOx sensor 145 may be installed at a different position.

Next at step S520, the control unit 150 determines whether the exhausted NOx amount detected at the step S510 is above a predetermined level.

When the exhausted NOx amount is not above the predetermined level, the regeneration control process S410 of the LNT 110 according to an exemplary embodiment of the present invention is finished.

When the exhausted NOx amount is above the predetermined level, the regeneration control of the LNT 110 is performed as follows.

As the regeneration control of the LNT 110, a first post-injection of the diesel engine 160 is performed at step S530 by a predetermined first injection amount and a predetermined first retardation angle of fuel injection.

The first post-injection is for increasing the exhaust gas temperature up to an appropriate regeneration temperature of the LNT 110. That is, the exhaust gas temperature of a general diesel engine is about 200° C., and the appropriate regeneration temperature of a general LNT 100 is about 250° C. to 450° C., although it may be different depending on LNTs. Therefore, the exhaust gas temperature is generally required to be increased such that LNT 110 may be heated to the appropriate regeneration temperature, and the first post-injection may be performed for that purpose.

Such a first post-injection is controlled at the first injection amount and at an injection timing retarded by the first retardation angle of fuel injection with respect to an appropriate main injection timing of the diesel engine. The first retardation angle of fuel injection and the first injection amount may be set to appropriate values, e.g. by consideration of a characteristic of the employed diesel engine 160.

After the first post-injection step S530, the control unit 150 determines at step S540 whether a predetermined LNT regeneration condition is satisfied.

The predetermined LNT regeneration condition is set to a condition appropriate the regeneration of the LNT 110. For example, the predetermined LNT regeneration condition may include: (1) the exhaust gas temperature of the diesel engine 160 is above a predetermined temperature; and (2) the air/fuel ratio determined based on the signal received from the $O_2$ sensor is in a rich range.

The predetermined temperature may be set e.g. by taking into account of the appropriate regeneration temperature of the LNT 110. For example, the predetermined temperature may be set to be above about 200° C. such as about 250° C.

When the predetermined LNT regeneration condition is not satisfied at the step S540, a predetermined exhaust gas temperature increasing process is performed at step S550.

The predetermined exhaust gas temperature increasing process S550 includes: a step S552 of retarding the main injection timing of the diesel engine 160; and a step S554 of performing a second post-injection of the diesel engine by a predetermined second injection amount and a predetermined second retardation angle of fuel injection. The above steps S552 and S554 are performed such that the exhaust gas temperature may be more rapidly increased, and the air/fuel ratio becomes more quickly changed into the rich range.

For example, the second injection amount may be set to be above the first injection amount, and the second retardation angle of fuel injection may be set to be greater than the first retardation angle of fuel injection.

When the predetermined LNT regeneration condition is satisfied at the step S540, the regeneration of the LNT 110 occurs at step S560.

Such a regeneration S560 of the LNT 110 continues until a predetermined LNT regeneration finishing condition is satisfied (refer to step S570.

For example, the LNT regeneration finishing condition may include a condition that a predetermined time has elapsed after the satisfaction of the LNT regeneration condition. In more detail, the predetermined time may be set in an order of a few seconds. By the way, the predetermined time may be optimized e.g. on the basis of the specification of the LNT such as a capacity of the employed LNT 110.

When the LNT regeneration condition is satisfied at the step S570, the control unit 150 stops the first post-injection started at the step S530 and the second post-injection started at the step S554, and accordingly, the regeneration of the LNT 110 is stopped.

In the above, the regeneration control process S410 of the LNT 110 according to an exemplary embodiment of the present invention has been described in detail with reference to FIG. 5.

Hereinafter, the dual step regeneration control process S420 of the CPF 115 according to an exemplary embodiment of the present invention will be described in detail with reference to FIG. 6.

Figure 6:
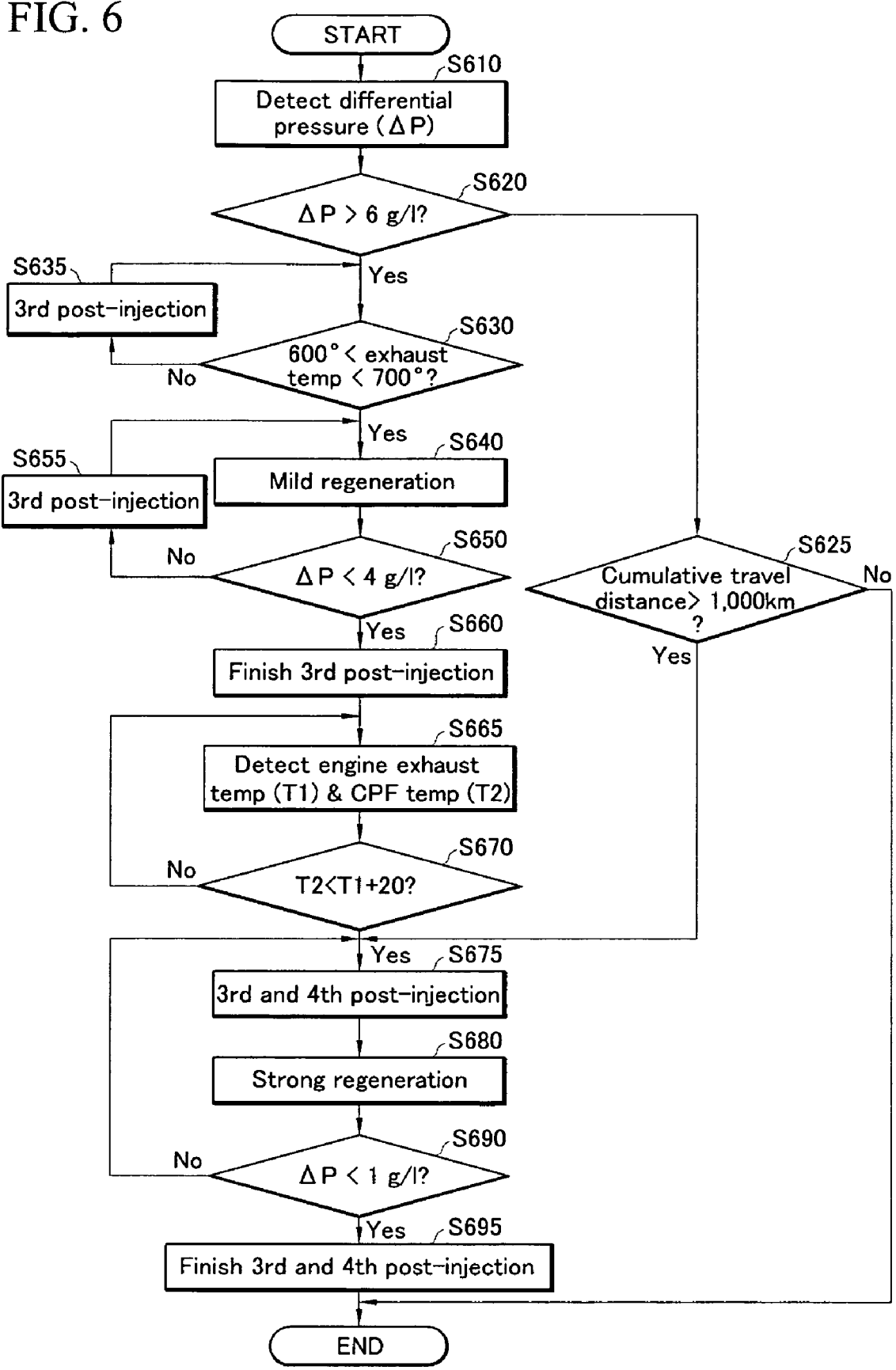
FIG. 6 is a detailed flowchart showing a dual step regeneration control process of the CPF according to a method for controlling regeneration of the simultaneous NOx-PM reduction apparatus according to an exemplary embodiment of the present invention.

FIG. 6 is a detailed flowchart showing a dual step regeneration control process S420 of the CPF according to a method for controlling regeneration of the simultaneous NOx-PM reduction apparatus according to an exemplary embodiment of the present invention.

As shown in FIG. 6, firstly at step S610, the control unit 150 detects a differential pressure $\Delta P$ across the CPF 115 on the basis of a signal received from the differential pressure sensor 135.

According to an exemplary embodiment of the present invention, the differential pressure detecting pipes 105 connected with the differential pressure sensor 135 is connected to the front and the rear of the simultaneous NOx-PM reduction apparatus 100. Therefore, the differential pressure $\Delta P$ is suitably measured across the simultaneous NOx-PM reduction apparatus 100, effectively. However, it should not be understood that the scope of the present invention is limited thereto. One of the differential pressure detecting pipes 105 may be connected to between the LNT 110 and the CPF 115 included in the simultaneous NOx-PM reduction apparatus 100, and in this case, pressure difference across the CPF 115 may be suitably measured.

Then, at step S620, the control unit 150 determines whether the differential pressure $\Delta P$ detected at the step S610 is above a first predetermined differential pressure.

The first predetermined differential pressure is a reference value used for determining whether the regeneration of the CPF 115 is required, and such a first predetermined differential pressure may be set to an appropriate value e.g. by taking into account of an exhaust characteristic of the engine 160. For example, according to an exemplary embodiment of the present invention, the differential pressure is set to a value corresponding to a trapped PM amount of greater than 4 g/l or 5 g/l such as about 6 g/l. Such a value is set to be above a half of a typical trapping capacity of the CPF 115, which is about 10 g/l. Such a high value of the first predetermined differential pressure implies that, according to the regeneration control of the CPF 115 of an exemplary embodiment of the present invention, durability of the CPF 115 may be maintained even if a mild regeneration of the CPF 115 is started at a high level of the trapped PM amount.

When the differential pressure $\Delta P$ is above the first predetermined differential pressure at the step S620, the control unit 150 determines at step S630 whether the exhaust gas temperature detected by the first exhaust gas temperature sensor 120 lies in a predetermined temperature range.

The predetermined temperature range is set to a temperature range that is appropriate for suppressing generation of unburned HC in the exhaust gas and for removing PM trapped in the CPF 115. For example, according to an exemplary embodiment of the present invention, the predetermined temperature range is set to be a range of about 600° C. to 700° C., although other temperature ranges also will be suitable.

When the exhaust gas temperature does not reach the predetermined temperature range at the step S630, the control unit 150 performs a third post-injection at step S635.

The third post-injection is for increasing the exhaust gas temperature such that the exhaust gas temperature may rise up to the predetermined temperature range. Such a third post-injection is controlled to be at the third injection amount and at a retarded injection timing by the third retardation angle of fuel injection with respect to the appropriate main injection timing of the diesel engine 160. The third retardation angle of fuel injection and the third injection amount may be set to be appropriate value e.g. by consideration of a characteristic of the employed diesel engine 160.

The third retardation angle of fuel injection may be set to be sufficiently close to the main injection timing. This is for prevent the post-injected fuel from burning in the simultaneous NOx-PM reduction apparatus 100 by enabling it to be burned in the engine combustion chamber and the exhaust manifold.

When the exhaust gas temperature has risen to the predetermined temperature range by the third post-injection process S635, the CPF 115 experiences the mild regeneration at step S640.

Generally, the unburned HC may experience an oxidation reaction in the LNT 110, and at this time the exhaust gas temperature is raised. However, according to the exemplary embodiment of the present invention, the unburned HC in the exhaust gas is suppressed, and therefore, the temperature increase by the oxidation reaction of the unburned HC is also suppressed. Therefore, the exhaust gas arriving at the CPF 115 is almost at the same temperature as before the LNT. In addition, the amount of $O_2$ contained in the exhaust gas is reduced by the third post-injection, and accordingly, temperature increase effect by an oxidation of the PM trapped in the CPF 115 is also suppressed.

Substantially long period of regeneration is required for a full regeneration of the CPF 115 by only the mild regeneration process S640. However, when the mild regeneration process is maintained excessively long, the post-injected fuel may cause lubricant dilution, deterioration of fuel mileage, and deterioration of engine durability.

Therefore, it is preferable that the mild regeneration process S640 is not excessively long. For that purpose, according to an exemplary embodiment of the present invention, at step S650, the control unit 150 determines whether the differential pressure $\Delta P$ becomes below a second predetermined differential pressure while the mild regeneration process S640 is performed.

For example, the second predetermined differential pressure according to an exemplary embodiment of the present invention is set to a value corresponding to a trapped PM amount of 4 g/l in the CPF 115. However, it is understood that such a configuration is merely exemplary and that the scope of the present invention is not limited thereto. For instance, the second predetermined differential pressure may be set to be another appropriate value different from one according to the exemplary embodiment, e.g. taking into account of the characteristics of the employed diesel engine 160 and the CPF 115.

While the differential pressure $\Delta P$ has not become below the second predetermined differential pressure, the control unit 150 maintains the third post-injection process at the third retardation angle of fuel injection and the third injection amount at step S655.

When the differential pressure $\Delta P$ has become below the second predetermined differential pressure, the mild regeneration process is finished at step S660, for example by finishing the third post-injection.

During the mild regeneration, the exhaust gas temperature may be relatively low, and accordingly, regeneration efficiency of the PM is also relatively low. In addition, such a mild regeneration of the CPF 115 regeneration dominantly occurs at a central portion of a CPF support. Therefore, when such a mild regeneration is repeated, an uncontrolled combustion may be suddenly caused in the CPF 115. Such an uncontrolled combustion may cause a damage of the CPF 115.

Therefore, it is preferable that such an uncontrolled combustion is prevented, and the regeneration may occur over a whole area of the CPF 115. For that purpose, the exemplary embodiment of the present invention employs a short but strong regeneration of the CPF 115 when the temperature of the CPF 115 is stable.

That is, firstly at step S665, the control unit 150 detects an exhaust gas temperature T1 at the engine output side by the first exhaust gas temperature sensor 120 and a CPF interior temperature T2 by the CPF temperature sensor 130.

Then at step S670, the control unit 150 determines whether the CPF interior temperature T2 is stable at a temperature above the exhaust gas temperature T1 by not more than a predetermined temperature difference.

For example, the predetermined temperature difference according to an exemplary embodiment of the present invention is set to be about 10° C. or 15° C. or greater such as about 20° C., although other predetermined temperature differences also will be suitable. In preferred systems, when the CPF interior temperature T2 is stable at a temperature above the exhaust gas temperature T1 by not more than the predetermined temperature difference, the control unit 150 performs a fourth post-injection as well as the third post-injection and a normal main fuel injection at step S675.

The third post-injection is performed by the above-mentioned third injection amount and the third retardation angle of fuel injection, the fourth post-injection is performed by a fourth retardation angle of fuel injection and a fourth injection amount. For example, the fourth retardation angle of fuel injection may be set to be larger than the third retardation angle of fuel injection, and the fourth injection amount may be set to be greater than the third injection amount.

According to the exemplary embodiment of the present invention, the fourth injection amount and the fourth retardation angle of fuel injection are set to be levels such that the CPF interior temperature may exceed 800° C.

By the post-injection control of the step S675, a strong regeneration is performed at step S680.

In such a strong regeneration, the unburned HC contained in the exhaust gas experiences the oxidation reaction in the LNT 110. At this time, the exhaust gas temperature in the LNT 110 accordingly rises, and thus the temperature of the exhaust gas supplied to the CPF 115 also rises. Remaining HC that is not completely burned in the LNT 110 flows into the CPF 115 and reacts with the catalyst, and accordingly, the CPF interior temperature is further raised.

By such an operation, the CPF 115 may uniformly have a high interior temperature, and accordingly, the PM trapped in the CPF 115 may be regenerated throughout a whole region of the CPF 115. Therefore, the remaining PM in the CPF 115 after the mild regeneration may be fully removed. In addition, by a high heat of the strong regeneration, a desulfurization effect of removing sulfur poisoning may also be achieved.

At step S690, the control unit 150 determines whether the differential pressure $\Delta P$ becomes below a third predetermined differential pressure during such a strong regeneration process.

For example, the third predetermined differential pressure according to an exemplary embodiment of the present invention is set to a value corresponding to a trapped PM amount of 1 g/l in the CPF 115. However, it should not be understood that the scope of the present invention is limited thereto. The third predetermined differential pressure may be suitably set to be another appropriate value different from one according to the exemplary embodiment of the present invention, e.g. by taking into account of the characteristics of the employed diesel engine 160 and the CPF 115.

While the differential pressure $\Delta P$ has not become below the third predetermined differential pressure, the control unit 150 continues the step S675 of the strong regeneration process by the third post-injection and the fourth post-injection.

When the differential pressure $\Delta P$ has become below the third predetermined differential pressure, the strong regeneration process is finished at step S695, for example by finishing the third and fourth post-injections.

In the above description, the dual step regeneration process of the CPF 115 including the mild regeneration and the strong regeneration on the basis of the depending on the differential pressure $\Delta P$ has been described in detail.

In addition thereto, according to an exemplary embodiment of the present invention, the strong regeneration is performed at each predetermined travel distance. Accordingly, the regeneration efficiency of CPF 115 may be raised, and a PM trapping margin of the CPF 115 may be obtained.

For that purpose, when the differential pressure $\Delta P$ is below the first predetermined differential pressure at the step S620, the control unit 150 determines whether a cumulative travel distance from a previous strong regeneration process is above a predetermined distance (refer to step S625).

For example, the predetermined distance according to an exemplary embodiment of the present invention is set to be a value of in excess of about 500 km, such as in excess of about 800 km such as about 1,000 km. As understood, the predetermined distance may be set to be another appropriate value different from one according to the exemplary embodiment, e.g. by taking into account of the characteristics of the employed diesel engine 160 and the simultaneous NOx-PM reduction apparatus 100.

When the cumulative travel distance from a previous strong regeneration process is above the predetermined distance, the step S675 is performed such that the strong regeneration process S680 may be performed.

When the cumulative travel distance from a previous strong regeneration process is not above the predetermined distance, the CPF regeneration process according to an exemplary embodiment of the present invention is finished.

As described above, according to an exemplary embodiment of the present invention, depending on trapped PM amount of the CPF, the CPF is suitably regenerated by a dual step regeneration process including a mild regeneration at the CPF interior temperature below 700° C. and a strong regeneration at the CPF interior temperature above 800° C.

Accordingly, the regeneration efficiency enhanced and thereby the fuel consumption of a diesel engine vehicle may be enhanced.

In addition, durability of the CPF may also be enhanced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling regeneration of the simultaneous NOx-PM reduction apparatus, the method comprising:
   detecting an exhaust gas differential pressure ΔP across the simultaneous NOx-PM reduction apparatus;
   determining whether the differential pressure is above a first predetermined differential pressure;
   determining whether the exhaust gas temperature of the engine lies in a predetermined temperature range, when the differential pressure ΔP is above the first predetermined differential pressure;
   performing a third post-injection by a predetermined third injection amount and a predetermined third retardation angle of fuel injection, when the exhaust gas temperature of the engine does not lie in the predetermined temperature range;
   determining whether a predetermined mild regeneration finishing condition is satisfied, when the exhaust gas temperature of the engine lies in the predetermined temperature range;
   determining whether a predetermined strong regeneration starting condition is satisfied, when the mild regeneration finishing condition is satisfied;
   performing a normal main fuel injection, the third post-injection, and a fourth post-injection by a fourth injection amount and a fourth retardation angle of fuel injection, when the predetermined strong regeneration starting condition is satisfied;
   determining whether a predetermined strong regeneration finishing condition is satisfied.

2. The method of claim 1 further comprising finishing the third post-injection and the fourth post-injection when the strong regeneration finishing condition is satisfied.

3. A method for controlling regeneration of the simultaneous NOx-PM reduction apparatus having a lean NOx trap (LNT) for removing nitrogen oxide (NOx) of an engine and a catalytic particulate filter (CPF) for trapping a particulate matter (PM) of the engine, the method comprising:
   detecting an exhaust gas differential pressure ΔP across the simultaneous NOx-PM reduction apparatus;
   determining whether the differential pressure is above a first predetermined differential pressure;
   determining whether the exhaust gas temperature of the engine lies in a predetermined temperature range, when the differential pressure ΔP is above the first predetermined differential pressure;
   performing a third post-injection by a predetermined third injection amount and a predetermined third retardation angle of fuel injection, when the exhaust gas temperature of the engine does not lie in the predetermined temperature range;
   determining whether a predetermined mild regeneration finishing condition is satisfied, when the exhaust gas temperature of the engine lies in the predetermined temperature range;
   determining whether a predetermined strong regeneration starting condition is satisfied, when the mild regeneration finishing condition is satisfied;
   performing a normal main fuel injection, the third post-injection, and a fourth post-injection by a fourth injection amount and a fourth retardation angle of fuel injection, when the predetermined strong regeneration starting condition is satisfied;
   determining whether a predetermined strong regeneration finishing condition is satisfied; and
   finishing the third post-injection and the fourth post-injection when the strong regeneration finishing condition is satisfied.

4. The method of claim 3, wherein the predetermined temperature range comprises a range of 600° C. to 700° C.

5. The method of claim 3, wherein the fourth injection amount and the fourth retardation angle of fuel injection are set to be levels such that the CPF interior temperature may exceed 800° C.

6. The method of claim 3, wherein the fourth injection amount is larger than the third injection amount, and the fourth retardation angle of fuel injection is greater than the third retardation angle of fuel injection.

7. The method of claim 3, wherein the first predetermined differential pressure is above a differential pressure corresponding to a half of a trapping capacity of the CPF.

8. The method of claim 7, wherein the first predetermined differential pressure is a differential pressure corresponding to a trapped PM amount of about 6 g/l.

9. The method of claim 3, wherein the predetermined mild regeneration finishing condition comprises a condition that the differential pressure is below a second predetermined differential pressure.

10. The method of claim 9, wherein the second predetermined differential pressure is a differential pressure corresponding to a trapped PM amount of about 4 g/l.

11. The method of claim 3, wherein the predetermined strong regeneration starting condition comprises a condition that a CPF interior temperature is stable at above an exhaust gas temperature of the engine by not more than a predetermined temperature difference.

12. The method of claim 11, wherein the predetermined temperature difference is about 20° C.

13. The method of claim 3, wherein the predetermined strong regeneration finishing condition comprises a condition that the differential pressure is below the third predetermined differential pressure.

14. The method of claim 13, wherein the third predetermined differential pressure is a differential pressure corresponding to a trapped PM amount of about 1 g/l.

15. The method of claim 3, wherein:
   the predetermined temperature range comprises a range of 600° C. to 700° C.; and
   the fourth injection amount and the fourth retardation angle of fuel injection are set to be levels such that the CPF interior temperature may exceed 800° C.

16. The method of claim 15, wherein:
   the first predetermined differential pressure is above a differential pressure corresponding to a half of a trapping capacity of the CPF;
   the predetermined mild regeneration finishing condition comprises a condition that the differential pressure is below a second predetermined differential pressure;
   the predetermined strong regeneration starting condition comprises a condition that a CPF interior temperature is stable at above an exhaust gas temperature of the engine by not more than a predetermined temperature difference; and
   the predetermined strong regeneration finishing condition comprises a condition that the differential pressure is below a third predetermined differential pressure.

17. The method of claim 16, wherein:
   the first predetermined differential pressure is a differential pressure corresponding to a trapped PM amount of about 6 g/l;

the second predetermined differential pressure is a differential pressure corresponding to a trapped PM amount of about 4 g/l; and the third predetermined differential pressure is a differential pressure corresponding to a trapped PM amount of about 1 g/l.

18. The method of claim 3, further comprising:

detecting an exhausted NOx amount contained in the exhaust gas of the engine; and performing a regeneration control of the LNT when the exhausted NOx amount is above a predetermined level.

19. The method of claim 18, wherein the exhausted NOx amount is detected as an amount of NOx contained in the exhaust gas that has passed the simultaneous NOx-PM reduction apparatus.

20. The method of claim 18, wherein the performing of regeneration control of the LNT comprises:

performing a first post-injection of the engine by a predetermined first injection amount and a predetermined first retardation angle of fuel injection;

determining whether a predetermined LNT regeneration condition is satisfied; and continuing the LNT regeneration until a predetermined LNT regeneration finishing condition, when the predetermined LNT regeneration condition is satisfied.

21. The method of claim 20, wherein the LNT regeneration finishing condition comprises a condition that a predetermined time has elapsed after the satisfaction of the LNT regeneration condition.

22. The method of claim 20, wherein the predetermined LNT regeneration condition comprises:

the exhaust gas temperature of the engine is above a predetermined temperature; and the air/fuel ratio determined based on the signal received from the $O_2$ sensor is in a rich range.

23. The method of claim 22, wherein the predetermined temperature is about 250° C.

24. The method of claim 20, wherein the performing of regeneration control of the LNT further comprises performing a predetermined exhaust gas temperature increasing process, when the predetermined LNT regeneration condition is not satisfied.

25. The method of claim 24, wherein the predetermined exhaust gas temperature increasing process comprises:

retarding a main injection timing of the engine; and performing a second post-injection of the engine by a predetermined second injection amount and a predetermined second retardation angle of fuel injection.

26. The method of claim 25, wherein:

the second injection amount is larger than the first injection amount; and the second retardation angle of fuel injection is greater than the first retardation angle of fuel injection.

27. An apparatus for controlling regeneration of a simultaneous NOx-PM reduction apparatus having a lean NOx trap (LNT) for removing nitrogen oxide (NOx) and a catalytic particulate filter (CPF) for trapping a particulate matter (PM), the NOx and PM being exhausted from a engine, the apparatus comprising:

a first exhaust gas temperature sensor detecting a temperature of an exhaust gas of the engine;

a second exhaust gas temperature sensor detecting a temperature of an exhaust gas flowing between the LNT and the CPF in simultaneous NOx-PM reduction apparatus;

a CPF temperature sensor detecting an interior temperature of the CPF;

a differential pressure sensor detecting a pressure difference across the simultaneous NOx-PM reduction apparatus;

an oxygen sensor detecting an oxygen density of the exhaust gas of the engine;

a NOx sensor detecting a NOx density in the exhaust gas; and a control unit receiving signal from the sensors and performing a regeneration control of the simultaneous NOx-PM reduction apparatus based on the received signal, wherein the control unit executes instructions for performing the method of claim 3.

* * * * *